Nov. 29, 1932.    P. DETTENBORN    1,889,594
ELASTIC FLUID POWER PLANT
Filed Feb. 28, 1930
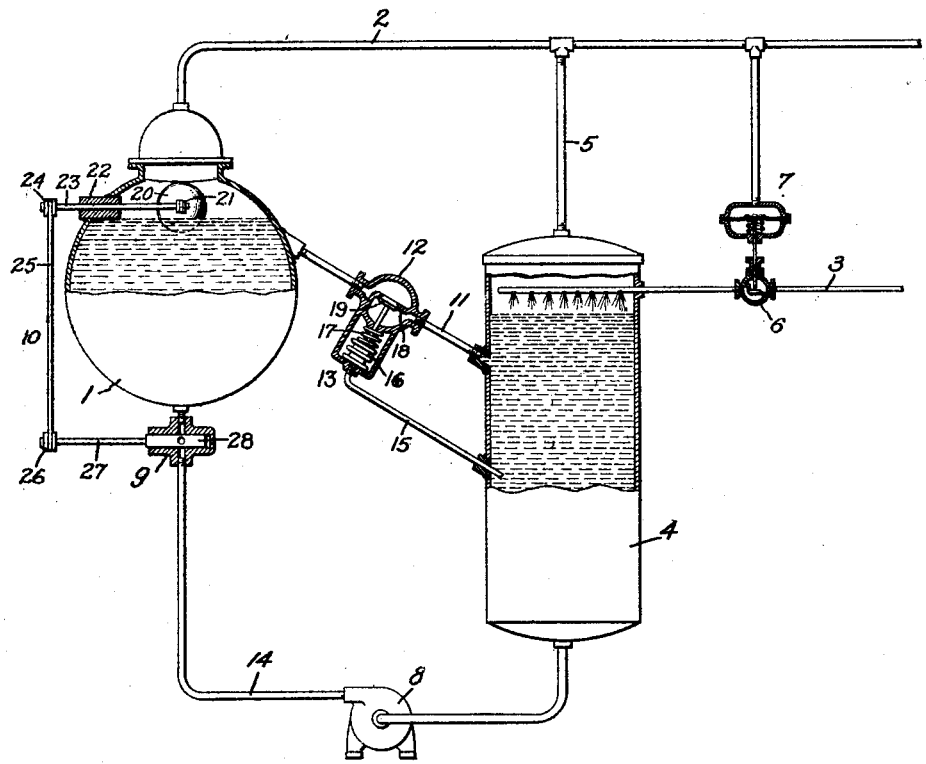
Inventor:
Paul Dettenborn,
by Charles E. Tullar
His Attorney.

Patented Nov. 29, 1932

1,889,594

UNITED STATES PATENT OFFICE

PAUL DETTENBORN, OF BERLIN-FRIEDENAU, GERMANY, ASSIGNOR TO GENERAL ELECTRIC COMPANY, A CORPORATION OF NEW YORK

ELASTIC FLUID POWER PLANT

Application filed February 28, 1930, Serial No. 432,242, and in Germany March 7, 1929.

My invention relates to improvements in elastic fluid power plants, and especially to such power plants wherein accumulators are utilized to preheat the fluid used in the elastic fluid generator.

The object of my invention is to provide an improved construction and arrangement in a power plant whereby the temperature of the feed fluid within the accumulator is maintained equal to or almost equal to that of the fluid within the generator, and by accomplishing this result obtain a more efficient operation in the twofold function of the accumulator in operating as a reservoir for elastic fluid and as a feed fluid heater.

In using the aforesaid type of accumulators the temperature of the feed fluid within the accumulator is lowered when elastic fluid is withdrawn therefrom in order to supply a sudden or peak demand by the consumers. This lowering of temperature in the feed fluid results in reducing the capacity of the accumulator as a reservoir for elastic fluid and in hindering the proper functioning of it as a feed water heater.

The accompanying drawing is a diagram of a portion of an elastic fluid generating plant in which I have illustrated a particular embodiment of my invention.

Referring to the said diagram, an elastic fluid generator 1, which may be of any of the suitable types, is shown connected to a main elastic fluid conduit 2 whereby the elastic fluid is supplied to the consumers.

Usually the demand for elastic fluid is variable and as the output of the generator is more or less constant over any given period there will be times when excess generation is taking place and again times when the demand for elastic fluid is greater than the generation thereof. This condition results in a variable elastic fluid pressure within the supply main 2. In order to equalize this pressure, that is, to provide a means whereby excess elastic fluid will be absorbed or a deficiency thereof supplied, feed fluid accumulator 4 is provided and connected by means of conduit 5 to the main supply line 2.

The feed liquid is so maintained within the accumulator, as is shown in the illustration, that a space exists in the upper portion. Into this space excess elastic fluid flows, and make up feed fluid is sprayed when arriving through conduit 3. By this means heat carried into the accumulator by the elastic fluid is imparted to the feed liquid, and this subtraction of heat from the elastic fluid causes a condensation thereof to take place. Feed fluid, at the same time, is being conducted away from the accumulator through conduit 14 and pump means 8 and fed into the generator. This flow of the feed fluid into the generator is controlled by means of any suitable valve 9 which is actuated by a suitable feed control mechanism 10.

The particular automatic boiler feed control device 10 consists of the float 20 securely attached to lever arm 21, the end of which is shown. Lever arm 21 is securely connected to shaft 23 which is pivotally supported by means of bushing or gland 22. Securely attached to one end of shaft 23 is lever arm 24, only the end of which can be seen in the diagram. Link 25 is pivotally connected to the other end of lever arm 24 and is also pivotally connected to lever arm 26, the end of which is visible in the diagram. The other end of lever arm 26 is securely attached to shaft 27 which in turn is directly attached to a cylindrical valve 28 which also acts as the pivotal support for shaft 27. Thus any raising or lowering of the fluid level in the generator imparts a like motion to float 20, which, by means of the lever, link and shaft system described, gives a rotary motion to valve 28, and which in turn opens or closes the opening within the valve 9 thereby admitting more fluid as the level within the generator drops or cutting down the flow if the level rises.

The description so far has shown the accumulator acting in its capacity as a feed water heater. If, on the other hand, a sudden or peak demand for elastic fluid arises from the consumers which exceeds the generation taking place within the generator, as some time is required for the readjustment within the generator to take place, the pressure in main line 2 will begin to drop, but as it starts dropping elastic fluid will start flowing back into the main line 2 from the accumulator 4 through conduit 5. This in turn tends to lower the pressure within the accumulator 4, and as this pressure lowers, generation will begin and continue so long as the temperature of the feed fluid therein exceeds the boiling point thereof for the then existing pressure.

In order to increase the output of the accumulator and also maintain the temperature of the feed fluid going into the generator, conduit 11, which connects the accumulator 4 directly to the generator 1, is used as a means whereby feed fluid within the generator, which is being heated from an external source, may be conducted into the accumulator. To control this flow and limit it to times when the temperature of the feed fluid within the accumulator is lower than a predetermined value, valve 12 is installed in the conduit 11. Valve 12, as shown, is actuated by a heat-responsive device 13 which responds to variations in temperature of the feed fluid within the accumulator 4.

The temperature-responsive device 13, mentioned above as the actuating apparatus for valve means 12, consists of a tube 15 sealed at one end and with the opposite end opening into an otherwise closed bellows like device 16. To the outer face or diaphragm of the bellows 16 is securely fastened the stem of valve 19 in order that the reciprocating motion of the bellows as it expands or contracts will be imparted to the valve. The enclosed space within the tube 15 and bellows 16 is filled with a medium having a determined coefficient of expansion.

In order that any variation in the temperature of the feed fluid, within accumulator 4, shall cause a corresponding change in the temperature of the medium within the tube 15 with the accompanying increase or decrease of volume giving to the diaphragm of the bellows the desired reciprocating motion, the sealed end of tube 15 is led through the casing of the accumulator and into the feed fluid within the accumulator for a small distance. A spring 17, concentrically mounted on the stem of valve 19 and shouldered against the valve guide and wall 18 of the valve chamber through which the valve stem protrudes, exerts a pressure upon the diaphragm of the bellows 16, but this pressure is resisted and the movement of the diaphragm controlled by the then existing volume of the expansible medium within the tube and bellows. Thus it may be observed that flow of liquid through conduit 11 is controlled and the amount thereof made to depend upon the temperature of the feed liquid within the accumulator 4.

From the explanation so far given and from the diagram, it can be readily seen that if feed fluid flows from the generator 1, which tends to lower the fluid level therein, then feed control device 10 will immediately open valve 9 wider in order that a corresponding additional amount of feed fluid will be pumped from the accumulator into the generator. Thus a circulation of feed fluid from the generator to the accumulator and from the accumulator to the generator is the result.

In order to further preserve heat within the accumulator 4, valve 6, which is actuated by pressure-responsive device 7, is installed in feed conduit 3 and restricts the flow of the cooler feed fluid into the accumulator when the pressure in main line 2 is lowered due to a sudden peak demand.

In accordance with the provisions of the patent statutes, I have described the principle of operation of my invention, together with the apparatus which I now consider to represent the best embodiment thereof, but I desire to have it understood that the apparatus shown is only illustrative, and that the invention may be carried out by other means.

What I claim as new and desire to secure by Letters Patent of the United States, is,—

1. In combination, an elastic fluid generating structure, an elastic fluid discharge conduit for the generating structure, an accumulator structure connected to the said discharge conduit whereby the accumulator may receive elastic fluid from or supply elastic fluid to said conduit, conduit means for conveying feed fluid from the accumulator structure to the generating structure, a feed fluid actuating means in said conduit, a valve means in said conduit for controlling flow into said generating structure, a means for actuating said valve and responsive to the variation of the height of the liquid within the generating structure, conduit means for conveying liquid from the generating structure to the accumulator structure, and a valve means in said conduit means for regulating the flow in the conduit means and responsive to variations of temperature of the feed fluid in the accumulator structure.

2. In combination, an elastic fluid generator, an elastic fluid discharge conduit for the generator, an accumulator so located that the liquid level in it will be at a lower elevation than the liquid level in the generator, a conduit means connecting the accumulator with the discharge conduit of the generator whereby elastic fluid may be received from or supplied to the said discharge conduit, conduit means for conveying feed fluid from the accumulator to the generator and a second conduit means for conveying liquid from the generator back to the accumulator, valve means in said first named conduit means responsive to variations in temperature of feed fluid in the accumulator, a feed fluid actuating means in the conduit means whereby feed fluid is conveyed from the accumulator to the generator, and control means whereby the flow of feed fluid from the accumulator is regulated dependent upon the liquid level within the generator.

3. In combination, an elastic fluid generator, an elastic fluid discharge conduit for the generator, an accumulator connected to the discharge conduit, means for supplying feed fluid to the generator comprising a conduit between the generator and the accumulator, and means for regulating the flow in the last named conduit in terms of level conditions in the generator, another conduit between the generator and the accumulator for supplying heated fluid from the generator to the accumulator, and means for regulating the flow of fluid in the last named conduit in terms of fluid temperature conditions in the accumulator, a feed water supply conduit for the accumulator and a pressure responsive device for regulating the flow of feed fluid in the last named conduit in terms of elastic fluid pressure conditions in the discharge conduit.

4. In combination, an elastic fluid generator, an elastic fluid discharge conduit for the generator, an accumulator connected to the discharge conduit, means for supplying feed fluid to the generator comprising a conduit between the generator and the accumulator, and means for regulating the flow in the last named conduit in terms of level conditions in the generator, another conduit between the generator and the accumulator for supplying heated fluid from the generator to the accumulator, and means for regulating the flow of fluid in the last named conduit in terms of fluid conditions in the accumulator.

In witness whereof, I have hereunto set my hand this 12th day of February, 1930.

PAUL DETTENBORN.